United States Patent Office 3,257,426
Patented June 21, 1966

3,257,426
17α - FLUORO-, 17β - CHLOROFLUOROACETOXY- AND 17β-METHYL-5,10-METHYLENE AND 5,10-SECO - 5,19 - CYCLO-10β-FLUORO ANDROSTANE DERIVATIVES
Lawrence H. Knox, Mexico City, Mexico, assignor to Syntex Corporation, Panama, Panama, a corporation of Panama
No Drawing. Filed Mar. 19, 1964, Ser. No. 353,256
21 Claims. (Cl. 260—397.3)

The present invention relates to certain novel cyclopentanophenanthrene derivatives and to methods for making the same.

More particularly, the present invention relates to certain novel 17α-fluoro, 17β-chlorofluoroacetoxy and 17β-methyl derivatives of the androstane series, represented by the following formulas:

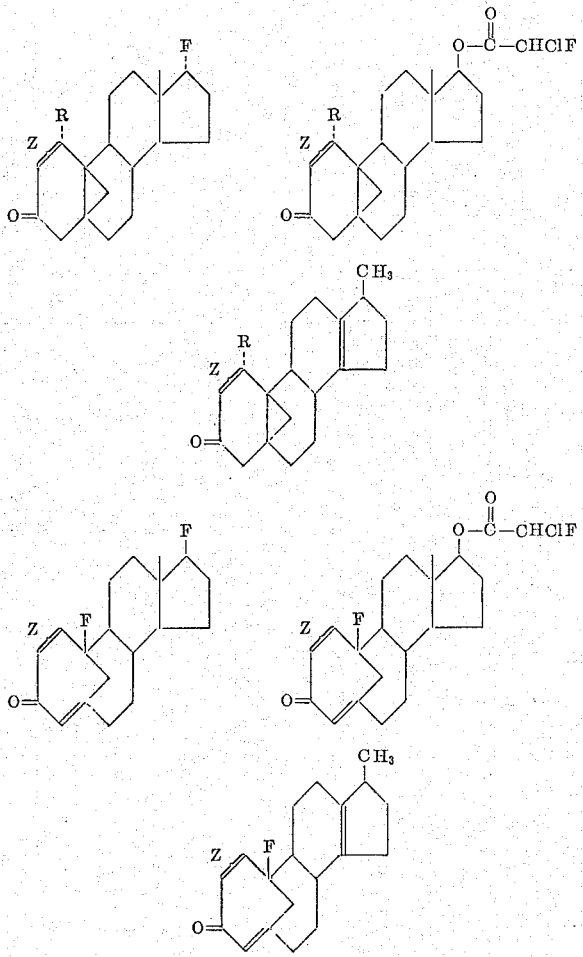

In the above formulas, R represents hydrogen, a lower alkyl, alkenyl or alkinyl radical such as methyl, ethyl, propyl, vinyl, propenyl, ethinyl, propinyl, etc., and Z represents a single or a double bond between C-1 and C-2.

These compounds are anabolic-androgenic agents with a favorable anabolic-androgenic ratio. In addition, they have anti-estrogenic, anti-gonadotrophic and antifibrillatory properties, lower the blood cholesterol level and inhibit the activity of the pituitary gland.

The method for producing the novel compounds of the present invention is illustrated by the following equation:

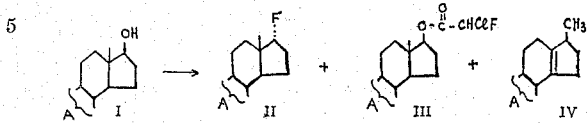

wherein A represents:

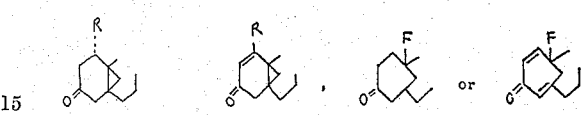

and R has the same meaning as heretofore indicated.

In practicing the process illustrated above, a 17β-hydroxy-5,10-methylene-19-nor-androstane derivative or a 17β - hydroxy - 5,10 - seco - 5,19 - cyclo - 10β - fluoro compound (I) is treated with 1 to 1.5 molar equivalents of a fluorinated amine such as 2-chloro-1,1,2-trifluoro-triethylamine, in a suitable organic solvent, at a temperature comprised between room temperature and the steam bath for a period of time of between 5 minutes to 3 hours. The solvent is then evaporated under reduced pressure, to produce a mixture of the 17α-fluoro-(II), 17β - chlorofluoroacetoxy - (III) and 17β - methyl - Δ¹³-(IV) corresponding derivatives, which are separated by chromatography on neutral alumina or Florisil.

The solvents suitable for this reaction are acetonitrile, ethers such as diethyl ether, isopropyl ether, dioxane, tetrahydrofuran, Dowanol and the like, aromatic hydrocarbons such as benzene, toluene, xylene, etc. In general, the reaction can be carried out in any organic solvent without acidic hydrogen.

An additional double bond may be introduced at C-1, C-2 in the 5,10-methylene-19-nor-androstanes and 5,10-seco-5,19-cyclo-10β-fluoro-Δ⁴-androstenes by conventional methods, such as for example, by reflux with 2,3-dichloro-5,6-dicyano-1,4-benzoquinone.

Examples of suitable starting materials for the process of the present invention are:

5,10-methylene-19-nor-androstan-17β-ol-3-one,
5,10-methylene-19-nor-Δ¹-androsten-17β-ol-3-one,
1α-methyl-5,10-methylene-19-nor-androstan-17β-ol-3-one,
1α-ethyl-5,10-methylene-19-nor-androstan-17β-ol-3-one,
1α-propyl-5,10-methylene-19-nor-androstan-17β-ol-3-one,
1α-vinyl-5,10-methylene-19-nor-androstan-17β-ol-3-one,
1α-ethinyl-5,10-methylene-19-nor-androstan-17β-ol-3-one,
1α-methyl-5,10-methylene-19-nor-Δ¹-androsten-17β-ol-3-one,
1α-ethyl-5,10-methylene-19-nor-Δ¹-androsten-17β-ol-3-one,
1α-vinyl-5,10-methylene-19-nor-Δ¹-androsten-17β-ol-3-one,
1α-ethinyl-5,10-methylene-19-nor-Δ¹-androsten-17β-ol-3-one,
5,10-seco-5,19-cyclo-10β-fluoro-Δ⁴-androsten-17β-ol-3-one and
5,10-seco-5,19-cyclo-10β-fluoro-Δ¹,⁴-androstadien-17β-ol-3-one.

These starting materials are obtained as follows:
5,10 - methylene - 19 - nor - Δ¹ - androsten - 17β - ol-3-one and 5,10-seco-5,19-cyclo-10β-fluoro-Δ⁴-androsten-17β-ol-3-one are obtained as described in my copending patent application Serial No. 286,931 filed June 11, 1963, now U.S. Patent No. 3,184,484 by reaction of 19-hydroxy-Δ⁴-androstene-3,17-dione with 2-chloro-1,1,2-trifluorotriethylamine to produce a mixture of 5,10-methylene-19-nor-Δ¹-androstene-3,17-dione and 5,10-seco-5,19-cyclo-10β-fluoro-Δ⁴-androstene-3,17-dione, which are separated by chromatography. Reduction of these compounds with lithium aluminum hydride gives rise to 5,10-methylene-19-nor-Δ¹-androstene-3β,17β-diol and 5,10-seco - 5,19 - cyclo - 10β - fluoro - Δ⁴ - androstene - 3β,17β-diol respectively, which are then selectively oxidized at C-3 by reaction with manganese dioxide in chloroform.

Catalytic hydrogenation of 5,10-methylene-19-nor-Δ¹-androsten-17β-ol-3-one produces the saturated compound, i.e., 5,10-methylene-19-nor-androstan-17β-ol-3-one, as described in my copending application Serial No. 286,913 filed June 11, 1963.

The 1α-alkyl, alkenyl and alkinyl substituted derivatives of 5,10-methylene-19-nor-androstan-17β-ol-3-one are obtained by reaction of 5,10-methylene-19-nor-Δ¹-androsten-17β-ol-3-one with a Grignard reagent, as described in my copending application Serial No. 346,074 filed February 20, 1964.

Upon dehydrogenation of these 1α-substituted compounds or dehydrogenation of 5,10-seco-5,19-cyclo-10β-fluoro-Δ⁴-androsten - 17β-ol-3-one with 2,3-dichloro-5,6-dicyano-1,4-benzoquinone, there are produced the corresponding 1-dehydro derivatives.

The following specific examples serve to illustrate but are not intended to limit the scope of the present invention:

PREPARATION 1

A mixture of 5 g. of 1α-methyl-5,10-methylene-19-nor-androstan-17β-ol-3-one, 100 cc. of dioxane and 3.5 g. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 100 g. of alumina. Crystallization from acetone-hexane gave 1-methyl-5,10-methylene - 19-nor-Δ¹-androsten-17β-ol-3-one.

In a similar manner, starting from 1α-ethyl-5,10-methylene-19-nor-androstan-17β-ol-3-one, 1α-propyl-5,10-methylene-19 - nor-androstan-17β-ol-3-one, 1α-vinyl-5,10-methylene-19-nor-androstan-17β-ol-3-one, 1α-ethinyl-5,10-methylene-19 - nor-androstan-17β-ol-3-one and 5,10-seco-5,19-cyclo-10β - fluoro-Δ⁴-androstan-17β-ol-3-one, there were obtained the corresponding dehydro-derivatives, namely, 1-ethyl-5,10-methylene-19-nor-Δ¹-androsten-17β-ol-3-one, 1-propyl-5,10-methylene - 19-nor-Δ¹-androsten-17β-ol-3-one, 1-vinyl-5,10-methylene-19-nor-Δ¹-androsten-17β-ol-3-one, 1-ethinyl-5,10-methylene - 19-nor-Δ¹-androsten-17β-ol-3-one and 5,10-seco-5,19 - cyclo-10β-fluoro-Δ¹,⁴-androstadien-17β-ol-3-one.

Example I

To a solution of 2 g. of 5,10-methylene-19-nor-androstan-17β-ol-3-one in 25 cc. of anhydrous tetrahydrofuran there was added 1.96 g. (1.5 molar equivalents) of 2-chloro-1,1,2-trifluorotriethylamine, and the reaction mixture held at room temperature for 30 minutes; it was then evaporated to dryness under reduced pressure and the residue chromatographed on 100 g. of neutral alumina, to produce 17α-fluoro-5,10-methylene-19-nor-androstan-3-one, 17β-chlorofluoroacetoxy - 5,10-methylene-19-nor-androstan-3-one, and 17B-methyl-5,10-methylene-18,19-bisnor-Δ¹³-androsten-3-one in pure form.

Example II

To a solution of 2.8 g. of 5,10-methylene-19-nor-androstan-17β-ol-3-one in 20 cc. of anhydrous acetonitrile there was added 1.9 g. of 2-chloro-1,1,2-trifluorothiethylamine, the mixture was heated on the steam bath for 15 minutes, evaporated to dryness under vacuo and chromatographed onto Florisil, to afford the pure 17α-fluoro-5,10-methylene-19 - nor-androstan-3-one, 17β-chlorofluoroacetoxy-5,10-methylene-19-nor-androstan-3-one and 17β-methyl-5,10-methylene-18,19-bisnor-androstan-3-one identical to those obtained in the preceding example.

Example III

Example I was repeated but using methylene chloride as solvent, with similar results.

Example IV

A solution of 1 g. of 5,10-methylene-19-nor-Δ¹-androsten-17β-ol-3-one in 40 cc. of anhydrous ether was treated with 1 molar equivalent of 2-chloro-1,1,2-trifluorotriethylamino and the mixture was heated on the steambath at reflux temperature for 30 minutes. The reaction mixture was then evaporated to dryness and the residue chromatographed on Florisil to produce 17α-fluoro-5,10-methylene-19 - nor-Δ¹-androsten-3-one, 17β-chlorofluoroacetoxy-5,10-methylene - 19-nor-Δ¹-androsten-3-one and 17β-methyl - 5,10-methylene-18,19 - bisnor-Δ¹,¹³-androstadien-3-one in pure form.

Example V

Example II was repeated but using ether as solvent, with similar results.

Example VI

By following the method of Example I, the compounds listed below under I were converted into the products set forth under II, which were separated by chromatography.

| I | II |
|---|---|
| 1α-ethyl-5,10-methylene-19-nor-androstan-17β-ol-3-one. | 1α-ethyl-17α-fluoro-5,10-methylene-19-nor-androstan-3-one. 1α-ethyl-17β-chlorofluoroacetoxy-5,10-methylene-19-nor-androstan-3-one and 1α-ethyl-17β-methyl-5,10-methylene-18,19-bisnor-Δ¹³-androsten-3-one. |
| 1α-propyl-5,10-methylene-19-nor-androstan-17β-ol-3-one. | 1α-propyl-17α-fluoro-5,10-methylene-19-nor-androstan-3-one, 1α-propyl-17β-chlorofluoroacetoxy-5,10-methylene-19-nor-androstan-3-one and 1α-propyl-17β-methyl-5,10-methylene-18-19-bisnor-Δ¹³-androsten-3-one. |
| 1α-vinyl-5,10-methylene-19-nor-androstan-17β-ol-3-one. | 1α-vinyl-17α-fluoro-5,10-methylene-19-nor-androstan-3-one. 1α-vinyl-17β-chlorofluoroacetoxy-5,10-methylene-19-nor-androstan-3-one and 1α-vinyl-17β-methyl-5,10-methylene-18,19-bisnor-Δ¹³-androsten-3-one. |
| 1α-ethinyl-5,10-methylene-19-nor-androstan-17β-ol-3-one. | 1α-ethinyl-17α-fluoro-5,10-methylnen-19-nor-androstan-3-one, 1α-ethinyl-17β-chlorofluoroacetoxy-5,10-methylene-19-nor-androstan-3-one and 1α-ethinyl-17β-methyl-5,10-methylene-18,19-bisnor-Δ¹²-androsten-3-one. |
| 5,10-seco-5,19-cyclo-10β-fluoro-Δ⁴-androsten-17β-ol-3-one. | 5,10-seco-5,19-cyclo-10β,17α-difluoro-Δ⁴-androsten-3-one, 5,10-seco-5,19-cyclo-10β-fluoro-17β-chlorofluoroacetoxy-Δ⁴-androsten-3-one and 5,10-seco-5,19-cyclo-10β-fluoro-17β-methyl-Δ⁴′¹³-18-nor-androstadien-3-one. |

Example VII

A mixture of 500 mg. of 5,10-seco-5,19-cyclo-10β,17α-difluoro-Δ⁴-androsten-3-one, 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 5,10-seco-5,19-cyclo-10β,17α-difluoro-Δ¹,⁴-androstadien-3-one.

In a similar manner, 5,10-seco-5,19-cyclo-10β-fluoro-17β - chlorofluoroacetoxy-Δ⁴-androsten-3-one and 5,10-seco-5,19-cyclo-10β-fluoro-17β - methyl - Δ⁴,¹³ - 18 - nor-androstadien-3-one were converted into the corresponding 1-dehydro derivatives, namely, 5,10-seco-5,19-cyclo-10β - fluoro - 17β - chlorofluoroacetoxy-Δ¹,⁴-androstadien-3-one and 5,10-seco-5,19-cyclo - 10β-fluoro-17β - methyl-Δ¹,⁴,¹³-18-nor-androstatrien-3-one.

*Example VIII*

Example I was repeated but instead of 30 minutes, the reaction mixture was allowed to stand at room temperature for 3 hours, with the same results.

By the same method, 5,10-seco-5,19-cyclo-10β-fluoro-Δ¹,⁴-androstadien-17β-ol-3-one was converted into 5,10-seco-5,19-cyclo-10β,17α-difluoro-Δ¹,⁴-androstadien - 3-one, 5,10-seco-5,19-cyclo-10β-fluoro-17β - chlorofluoroacetoxy-Δ¹,⁴-androstadien-3 - one and 5,10 - seco-5,19-cyclo-10β-fluoro-17β-methyl-Δ¹,⁴,¹³-18-nor-androstatrien-3-one identical to the products in the preceding example.

*Example IX*

In accordance with the method described in Example II, the compounds mentioned below under I were converted into the products set forth under II, which were separated by chromatography on Florisil:

| I | II |
|---|---|
| 1α-methyl-5,10-methylene-19-nor-Δ¹-androsten-17β-ol-3-one. | 1α-methyl-17α-fluoro-5,10-methylene-19-nor-Δ¹-androsten-3-one, 1α-methyl-17β-chlorofluoro-acetoxy-5,10-methylene-19-nor-Δ¹-androsten-3-one and 1α,17β-dimethyl-5,10-methylene-18,19-bisnor-Δ¹,¹³-androstadien-3-one. |
| 1α-ethyl-5,10-methylene-19-nor-Δ¹-androsten-17β-ol-3-one. | 1α-ethyl-17α-fluoro-5,10-methylene-19-nor-Δ¹-androsten-3-one, 1α-ethyl-17β-chlorofluoro-acetoxy-5,10-methylene-19-nor-Δ¹-androsten-3-one and 1α-ethyl-17β-methyl-5,10-methylene-18,19-bisnor-Δ¹,¹³-androstadien-3-one. |
| 1α-vinyl-5,10-methylene-19-nor-Δ¹-androsten-17β-ol-3-one. | 1α-vinyl-17α-fluoro-5,10-methylene-19-nor-Δ¹-androsten-3-one, 1α-ethyl-17β-chlorofluoro-acetoxy-5,10-methylene-19-nor-Δ¹-androsten-3-one and 1α-vinyl-17β-methyl-5,10-methylene-18,19-bisnor-Δ¹,¹³-androstadien-3-one. |
| 1α-ethinyl-5,10-methylene-19-nor-Δ¹-androsten-17β-ol-3-one. | 1α-ethinyl-17α-fluoro-5,10-methylene-19-nor-Δ¹-androsten-3-one, 1α-ethinyl-17β-chlorofluoro-acetoxy-5,10-methylene-19-nor-Δ¹-androsten-3-one and 1α-ethinyl-17β-methyl-5,10-methylene-18,19-bisnor-Δ¹,¹³-androstadien-3-one. |

I claim:
1. A compound of the following formula:

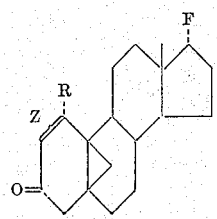

wherein R is selected from the group consisting of hydrogen, lower alkyl, lower alkenyl and lower alkinyl and Z is selected from the group consisting of a double bond and a saturated linkage between C–1 and C–2.

2. 17α-fluoro-5,10-methylene-19-nor-androstan-3-one.
3. 17α - fluoro - 5,10-methylene-19-nor-Δ¹-androsten-3-one.
4. 1α - methyl - 17α - fluoro-5,10-methylene-19-nor-androstan-3-one.
5. 1α - methyl-17α - fluoro-5,10-methylene-19-nor-Δ¹-androsten-3-one.

6. A compound of the following formula:

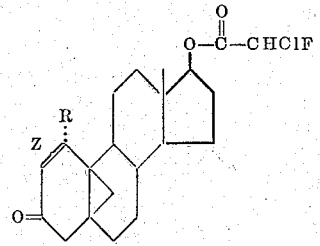

wherein R is selected from the group consisting of hydrogen, lower alkyl, lower alkenyl and lower alkinyl and Z is selected from the group consisting of a double bond and a saturated linkage between C–1 and C–2.

7. 17β - chlorofluoroacetoxy - 5,10 - methylene-19-nor-androstan-3-one.
8. 17β - chlorofluoroacetoxy - 5,10 - methylene-19-nor-Δ¹-androsten-3-one.

9. A compound of the following formula:

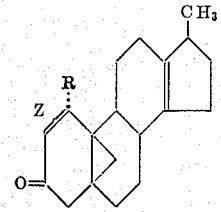

wherein R is selected from the group consisting of hydrogen, lower alkyl, lower alkenyl and lower alkinyl and Z is selected from the group consisting of a double bond and a saturated linkage between C–1 and C–2.

10. 17β - methyl - 5,10 - methylene - 18,19-bis-nor-Δ¹³-androsten-3-one.
11. 17β - methyl - 5,10 - methylene-18,19-bis-nor-Δ¹,¹³-androstadien-3-one.
12. 1α,17 - dimethyl - 5,10 - methylene - 18,19-bis-nor-Δ¹³-androsten-3-one.
13. A compound of the following formula:

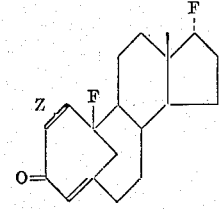

wherein Z is selected from the group consisting of a double bond and a saturated linkage between C–1 and C–2.

14. 5,10 - seco - 5,19 - cyclo-10β,17α-difluoro-Δ⁴-androsten-3-one.
15. 5,10 - seco - 5,19 - cyclo - 10β,17α-difluoro-Δ¹,⁴-androstadien-3-one.

16. A compound of the following formula:

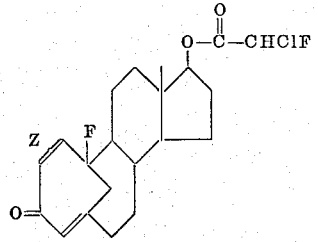

wherein Z is selected from the group consisting of a double bond and a saturated linkage between C–1 and C–2.

17. 5,10 - seco - 5,19-cyclo-10β-fluoro-17β-chlorofluoro-acetoxy-Δ⁴-androsten-3-one.

18. 5,10 - seco - 5,19-cyclo-10β-fluoro-17β-chlorofluoro-acetoxy-$\Delta^{1,4}$-androstadien-3-one.

19. A compound of the following formula:

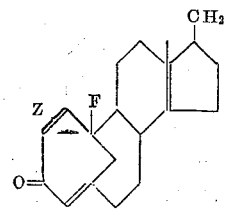

20. 5,10 - seco - 5,19-cyclo-10β-fluoro-17β-methyl-$\Delta^{4,13}$-18-nor-androstadien-3-one.

21. 5,10 - seco - 5,19 - cyclo - 10β - fluoro-17β-methyl-$\Delta^{1,4,13}$-18-nor-androstatrien-3-one.

References Cited by the Examiner

UNITED STATES PATENTS 3,013,027  12/1961  Ruzicka et al. _____ 260—397.4

LEWIS GOTTS, *Primary Examiner.*

HENRY A. FRENCH, *Assistant Examiner.*